United States Patent [19]

Luebbers

[11] 4,084,369
[45] Apr. 18, 1978

[54] CHAIN LINK ASSEMBLY AND DISASSEMBLY TOOL

[76] Inventor: Herman E. Luebbers, Rte. 1, Box 194C, Randolph, Nebr. 68771

[21] Appl. No.: 792,689

[22] Filed: May 2, 1977

[51] Int. Cl.² .............................................. B21L 21/00
[52] U.S. Cl. .......................................... 59/7; 269/249
[58] Field of Search ............... 59/7, 11; 269/249, 246; 29/283, 275, 276

[56] References Cited

U.S. PATENT DOCUMENTS

| 2,691,267 | 10/1954 | Baber | 59/7 |
| 2,698,550 | 1/1955 | Hill | 269/249 |
| 3,009,313 | 11/1961 | Wheeler | 59/7 |
| 3,041,820 | 7/1962 | Timmerman | 59/7 |
| 3,364,674 | 1/1968 | Banker | 59/7 |
| 3,462,944 | 8/1969 | Madre | 59/11 |
| 3,626,497 | 12/1971 | Lambert | 269/249 |

FOREIGN PATENT DOCUMENTS

| 473,729 | 5/1951 | Canada | 59/7 |

Primary Examiner—Lowell A. Larson
Assistant Examiner—Gene P. Crosby

[57] ABSTRACT

Improved tool for easy removal and reassembly of selective links of a sprocket chain wherein a specially designed vise tightly clamps one or more links of the chain therein. A uniquely shaped impact punch is positioned to properly hold a selected link adjacent the vise, then transmits sharp impacts to the link to more quickly and easily dislodge the selected link from the remainder of the chain. The vise includes a stationary jaw or bucking block and a relatively movable jaw with the opposed faces thereof having inwardly protruding side edges to provide a recess or clearance in the mid-section of the jaws for receiving the outwardly bowed edges of the chain link held therein, whereby a better gripping relationship may be obtained. Further, the movable jaw is caused to tilt inwardly toward the bucking block at the top upon application of clamping pressure, whereby the clamp link(s) resist inadvertent dislodgement.

4 Claims, 6 Drawing Figures

CHAIN LINK ASSEMBLY AND DISASSEMBLY TOOL

BACKGROUND OF THE DISCLOSURE

Steel sprocket chains formed of a plurality of releasably connectable links have been utilized in a wide variety of situations. Such sprocket chains are commonly used in a variety of farm machinery such as grain elevators, manure spreaders and unloaders, as well as in a wide variety of conveyor systems and other similar situations in which chain drives are used to turn sprockets for one reason or another. The links of such chains are, for the most part, relatively similar in that each includes a generally rectangular, open framework having a pintle or male connecting part extending along one end thereof and a sleeve or female connecting part extending along the opposite edge. The pintle of one link is slid transversely to the longitudinal axis of the chain into the sleeve of the adjacent chain link, through a slot in the sleeve approximately the same width as the thickness of the chain link. When the chain is then put in use, the hinge connection remains together, and is very unlikely to separate.

Another characteristic of such links is that the connecting members or bars along the top and bottom of each link are generally bowed outwardly at the center thereof, so that the center of the links is generally wider than the end points at which the links are connected. This commonly causes problems in gripping the links from the side, as is the case in vise-like gripping members.

It often becomes necessary during the operation of equipment to replace one or more links because of damage or for various other reasons. In such cases it is very difficult to remove the chain from the piece of equipment and carry it to a repair point such as a workshop. Therefore, some kind of tool which can be used on site is needed.

Several attempts have been made to provide a tool for repairing sprocket chains at the location or on the sites where they are used. Examples of such approaches are illustrated and described in U.S. Pat. Nos. 3,009,313 to Wheeler; 3,364,674 to Banker; and 3,462,944 to Madre. For one reason or another, apparently these tools have not been widely accepted. One possibility is that each of these tools requires a constantly applied pressure tending to separate the damaged link from the remainder of the chain, and such constantly applied pressure is simply not sufficient for one reason or another. None of these approaches, however, utilizes sharp impacts against the edge of one of the links to separate and remove the damaged link from the chain. Also, other problems with the prior art devices might include access to the sprocket chain while on the equipment, proper clamping of the chain links within some type of clamping mechanism to apply the pressure, or the like.

The present invention, on the other hand, approaches the problem from the standpoint of first improving the clamping device then using sharp impacts to dislodge the damaged link. Accompanying this conceptual approach, the instant invention utilizes a novel configuration for a clamping vise which more effectively clamps one or more links of the chain between the jaws thereof and prevents this inadvertent dislodgement, as well as a uniquely designed impact punch which is slotted according to a prescribed configuration at the operative end thereof to better hold and align the web portion of one link with the elongated slot in the sleeve in the adjacent link for separation.

Toward this end, the novel configuration of the vise includes a base member which has an upstanding bucking block at one end and a support block, having a threaded opening therein, secured to the base toward the other end. The support block receives a threaded rod therein and supports it parallel to and above the surface of the base. A movable vise jaw is relatively loosely attached to the threaded rod and is movable toward and away from the bucking block responsive to turning of the rod to effect a clamping action on a portion of the sprocket chain placed therein. The end portions of the wall faces forming the sides of the trackway between the vise jaws protrude inwardly to provide more clamping surface against the portions of the link adjacent the pintle and/or sleeve, and the clearance or recess between the protruding portions provide additional clamping pressure against the bowed out portion of the link edges, whereby a better gripping result is achieved.

Further, the threaded rod includes a ball or rounded end which impinges upon the movable vise jaw at a point above the level at which the link web is placed between the jaw members. When the movable jaw member is urged toward the bucking block, the top portion of the movable jaw wall tends to slant inwardly toward the bucking block, thereby preventing inadvertent release of the chain portion clamped therein.

It is one object of the present invention to provide an improved tool for the assembly and disassembly of the links of a sprocket chain.

It is another object of the present invention to provide such a tool as described herein which is easily portable and may be utilized while the chain is still mounted on the equipment with which it is associated.

It is yet another object of the present invention to provide a tool of the type described which implements an impact approach to link disassembly rather than a constant force concept.

It is still another object of the present invention to provide a tool of the type described which includes an improved vise mechanism for more securely holding the sprocket chain therein in preparation for the impact blows to be delivered to the link adjacent the tool held portion of the chain Other objects and a fuller understanding of the invention will become apparent from reading the following detailed disclosure of a preferred embodiment along with the accompanying drawings in which.

DETAILED DESCRIPTION OF A PREFERRED EMBODIMENT

Figure 1:
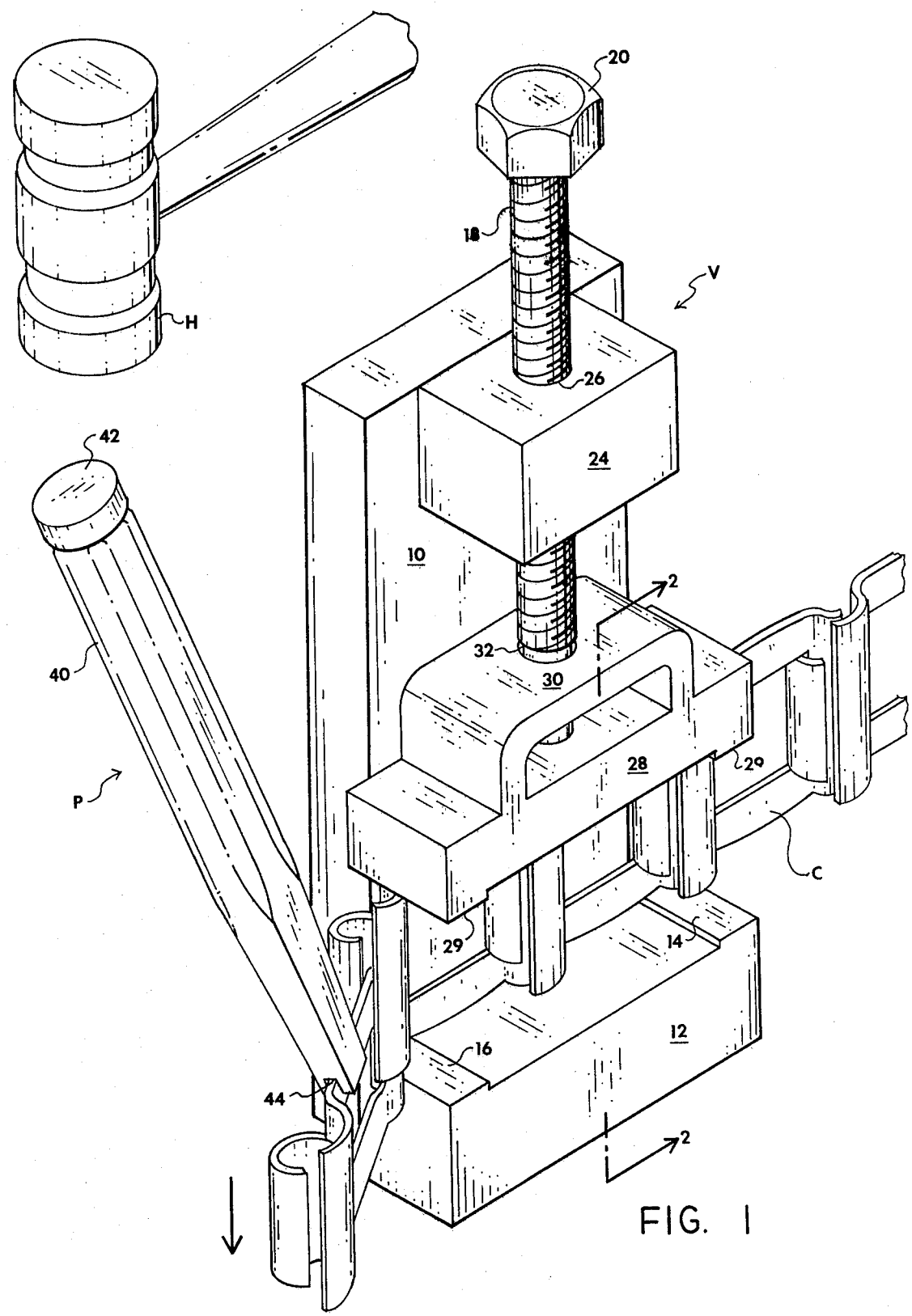
FIG. 1 is a perspective view illustrating the tool according to the present invention in use.
Figure 2:
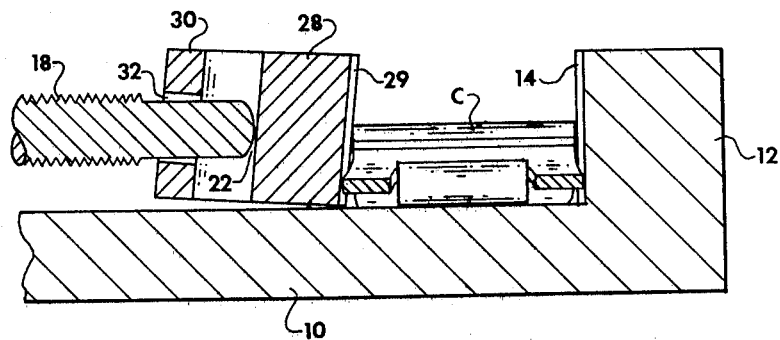
FIG. 2 is a sectional view taken substantially along lines 2—2 in FIG. 1.
Figure 3:
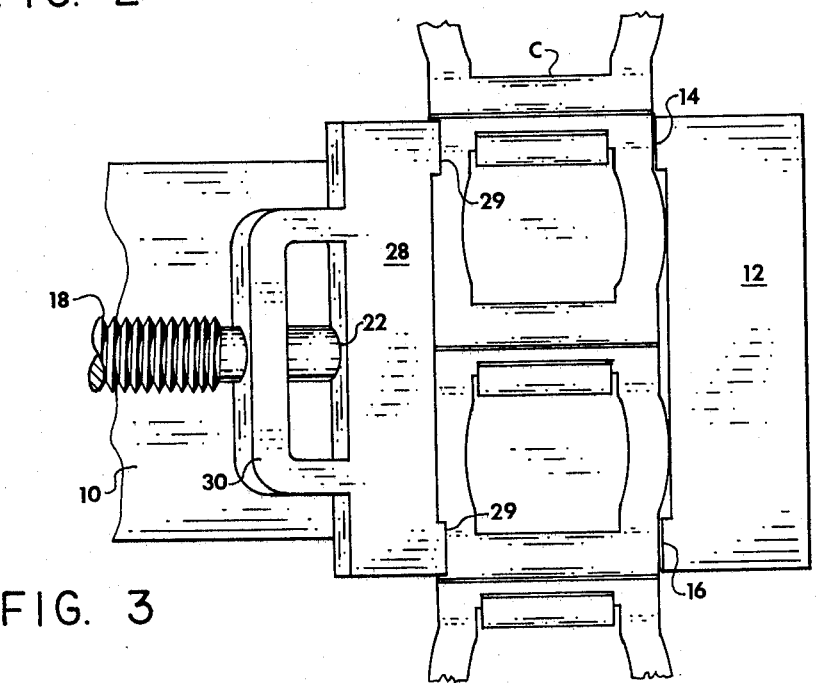
FIG. 3 is a plan view of a portion of the tool according to the present invention.
Figure 5:
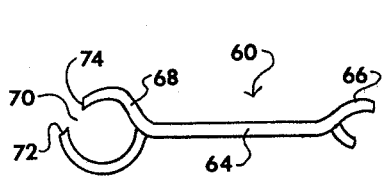
FIG. 5 is a side view illustrating the edge of the link of FIG. 4.
Figure 4:
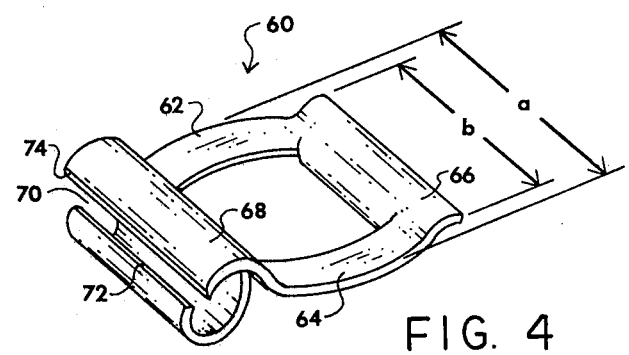
FIG. 4 is a perspective view illustrating a single link of the sprocket chain with which the pesent invention is adapted for use.

Turning now to the drawings, in FIGS. 1-3 there is illustrated the chain link disassembly and assembly apparatus according to the present invention. This apparatus is adapted for use with detachable link, sprocket chains of the type having links 60 as illustrated in FIGS. 4 and 5. In general, each of such links 60 includes a generally rectangular shaped frame having a male end or pintle 66 and a female end or sleeve 68 connected by upper and lower bridging members or bars 62,64. Sleeve 68 includes a transversely extending access slot 70 defined by edges 72,74 of the sleeve 68. The slot is of a width substantially the same or slightly smaller than the thickness of the bridging members 62,64. To connect the links 60, the pintle 66 of one link is slid transversely through the sleeve 68 of the adjacent link 60, whereupon the links remain connected, as in use the links do not again assume the position where the web of one link is aligned with the slot of the adjacent sleeve and transverse pressure applied. To disassemble the links, the reverse procedure is involved with the bridging members 62,64 or web being aligned with the slot 70, and then being forced transversely therethrough until disassembly is complete. To better understand the invention, it is also pointed out that in conventional links 60, the bridging members 62 are bowed slightly outwardly, so that the width (a) of the link across the bridging members is slightly larger than the width (b) of the link across the connecting point.

Turning now to FIGS. 1-3 in which the apparatus according to the present invention is illustrated, the vise means V includes a base member 10 having an upstanding bucking block 12 at one end thereof. A support block 24 is welded or otherwise secured to base 10 at the other end of base 10 from bucking block 12 and includes a threaded opening 26 therethrough which receives a threaded rod 18. A movable vise jaw 28 is loosely mounted on the end of the threaded rod nearest bucking block responsive to a turning of the threaded rod 18, by means of a wrench holding head 20, to effect a clamping action on the sprocket chain C deposited therebetween.

Figure 6:
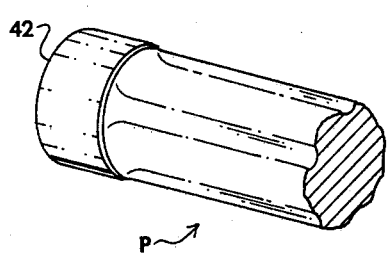
FIG. 6 is a perspective view with parts broken away illustrating the punch itself.
Figure 6:
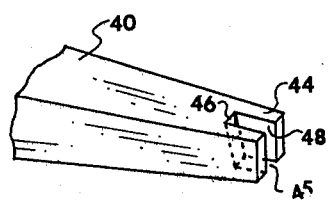

The other portion of the apparatus is an impact punch P comprising an elongated member 40 having a large end 42 and a smaller end 44. The smaller end 44 includes a slot extending transversely thereacross and forming a groove 45 therein defined by an inclined base wall 46 and a pair of side walls 48, as illustrated in FIG. 6.

In use, the sprocket chain is secured within the vise V and the impact punch P assembled onto the edge and closely adjacent the male end or pintle of the nearest chain link adjacent the vise. By manipulating the punch P, the nearest link may be twisted to align the web thereof with the opening in the sleeve of the clamped adjacent link, whereupon sharp impact blows applied to the large end of the impact punch will dislodge the links held by punch P from the adjacent link in the vise. Assembly of a new link merely involves the reverse of the above operation.

It should be noticed that the face of bucking block 12 includes raised end portions 14,16, while the cooperating surface of movable vise jaw 28 also includes raised end portions 29. As mentioned hereinabove the purpose of this becomes evident, especially when viewing the shape of the chain as illustrated in FIGS. 3 and 4. It is again noted that the chain links 60 include the bridging members 62,64, which bow outwardly in the mid-portion thereof. Therefore, if the walls of the vise V were perpendicular and flat, the sprocket chain would engage only against the outermost portion of the arcuate surface and a good, solid gripping relation would not be established. In FIG. 3, there is best shown the advantage obtained by the raised end portions 14,16 and 29 of bucking block 12 and vise jaw 28 respectively. As is evident from FIG. 3, there is engagement of the chain link at several areas along the surface thereof, and a much better gripping relation is established.

Also, the movable vise jaw 28 includes a yoke 30 having an opening 32 therein through which the threaded rod 18 is received. Opening 32 is slightly larger than the threaded rod so that the vise jaw 28 is relatively loosely suspended therefrom rather than being secured. There is no connection either between the vise jaw 28 and base 10 or between the vise 28 and the ball end portion 22 of rod 18. As evident from an inspection of FIG. 2, when the threaded rod 18 is tightened through the threaded opening 26 of bearing block 24, the vise jaw 28 is caused to tilt inwardly at the top, as the pressure point of the threaded rod against the vise jaw 28 impinges the vise jaw at a point above the level at which the links of chain C are gripped. Therefore, the inclined attitude of the inner surface of vise jaw 28 prevents inadvertent movement of the chain upwardly (in FIG. 2), which might cause dislodgement of the sprocket chain therefrom.

As evident from an inspection of FIG. 6, the base wall 46 forming the groove 45 is inclined with respect to the longitudinal and transverse axes of the punch so that more surface area engages the link which is gripped thereby, even though the punch P may be tilted.

Although a detailed description of a preferred embodiment has been set forth hereinabove, it is obvious that various changes and modifications might be made to the structure as far as size and shape is concerned without departing from the scope of the invention which is set forth in the following claims.

What is claimed is:

1. A chain link disassembly and assembly apparatus for use with detachable sprocket chains of the type with links which include a generally rectangular shaped frame with a male end or pintle and an open-sided female end or sleeve at the other end, the pintle of one link being received and the sleeve of an adjoining link to connect the two, said apparatus comprising:
   (a) a vise means including:
      (i) a base member with an upstanding bucking block at one end thereof;
      (ii) a support block having a threaded opening therein secured to said base toward the other end thereof from said bucking block and receiving a theaded rod therein;
      (iii) a movable vise jaw loosely mounted on said threaded rod and movable toward and away from said bucking block responsive to a turning movement of said rod to effect a clamping action on the portion of said sprocket chain placed therebetween;
   (b) an impact punch having a large and a smaller end, a slot extending transversely across the smaller end forming a groove therein with a base wall and a pair of side walls, the distance between said side walls being substantially the same or slightly greater than the thickness of the material forming the links of said chain; and (c) whereby when the link chain is secured within said vise and the impact punch assembled onto the edge and closely adjacent the male end or pintle of the nearest chain link adjacent the vise said nearest chain link may be twisted to align the pintle thereof with the sleeve of the clamped adjacent link, sharp impact blows applied to the large end of said impact punch will dislodge the two links.

2. The apparatus according to claim 1 wherein the confronting faces of said bucking block and movable vise jaw each include built up side edges at either end which protrude inwardly toward the opposite face to provide a recess therebetween and a better clamping surface.

3. The apparatus according to claim 1 wherein said movable vise jaw includes a yoke secured to the rear side thereof having an opening therein through which said threaded rod extends and impinges against the rear surface of said movable vise jaw at a point above the level where said link chain is secured between said bucking block and said movable vise jaw so that said vise jaw tilts inwardly at the top thereby preventing inadvertent dislodgement of said chain during the ensuing disassembly or assembly operation.

4. The apparatus according to claim 1 wherein said base wall of the groove in said punch extends along a sloping or angular line with respect to the longitudinal axis of said punch to provide more surface area between said side walls when the punch is in use.

* * * * *